S. DAVIDSON.
EMERGENCY TIRE FOR AUTOMOBILES.
APPLICATION FILED JULY 10, 1911.
1,070,670.
Patented Aug. 19, 1913.
2 SHEETS—SHEET 1.
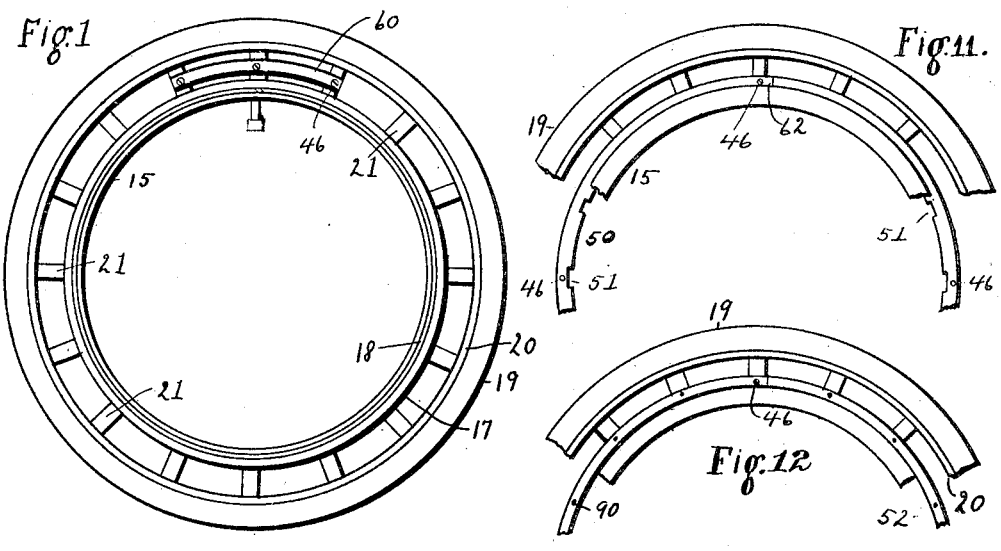
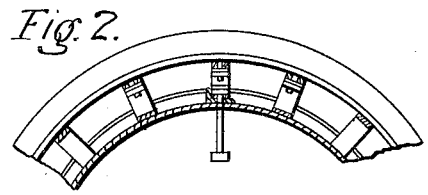
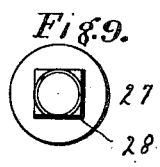
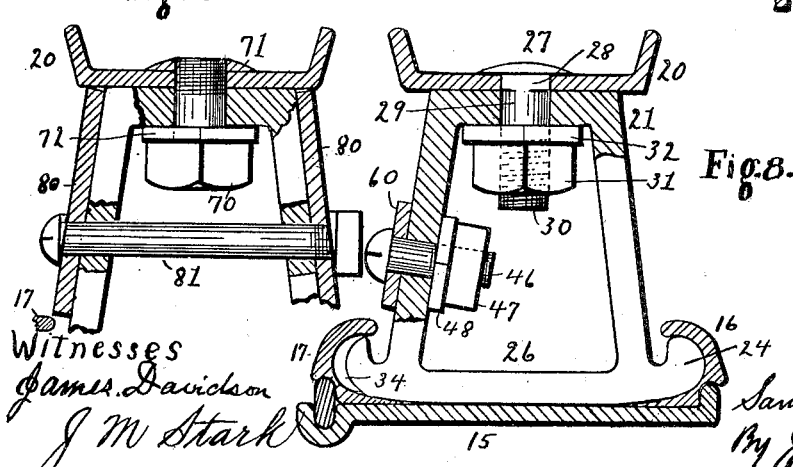
Witnesses
James Davidson
J M Stark
Inventor
Samuel Davidson
By J A Rami atty.

S. DAVIDSON.
EMERGENCY TIRE FOR AUTOMOBILES.
APPLICATION FILED JULY 10, 1911.
1,070,670.
Patented Aug. 19, 1913.
2 SHEETS—SHEET 2.
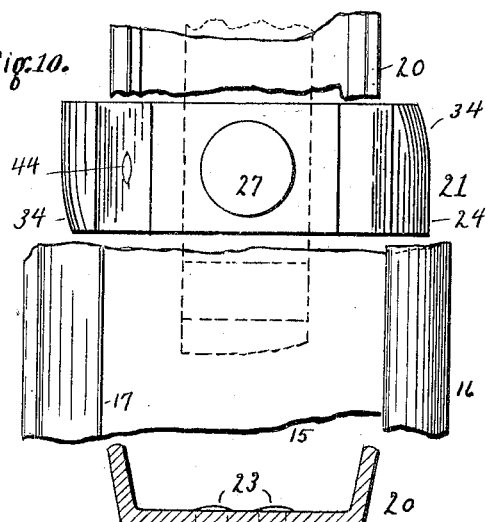
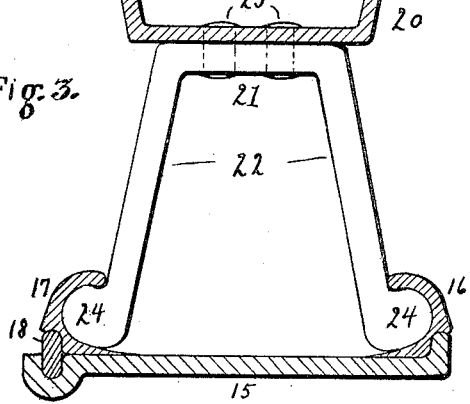
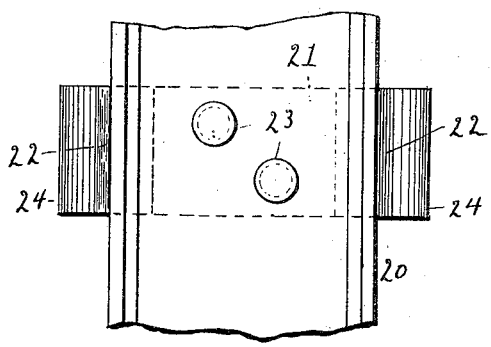
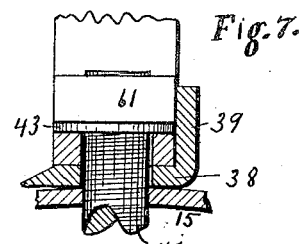
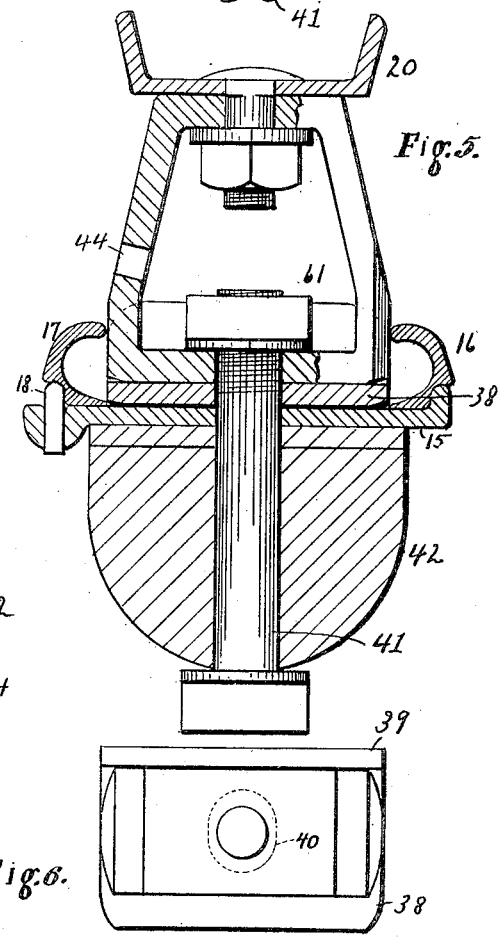
Witnesses
James Davidson
J. M. Stark
Inventor
Samuel Davidson
By J. A. Rasar Atty

UNITED STATES PATENT OFFICE.

SAMUEL DAVIDSON, OF INDIANAPOLIS, INDIANA.

EMERGENCY-TIRE FOR AUTOMOBILES.

1,070,670.

Specification of Letters Patent.   Patented Aug. 19, 1913.

Application filed July 10, 1911.   Serial No. 637,669.

*To all whom it may concern:*

Be it known that I, SAMUEL DAVIDSON, a citizen of the United States, residing at Indianapolis, in the county of Marion and State of Indiana, have invented certain new and useful Improvements in Emergency-Tires for Automobiles, of which the following is a specification.

In the use, in an emergency tire for automobiles, of any suitable non-pneumatic tire, such as a regulation solid or cushion rubber tire, or metal tire of sufficient tread, it is obviously necessary to interpose some suitable means between the wheel rim and the emergency tread portion whereby the tread portion is properly mounted upon the wheel rim, which latter is adapted for the reception of a pneumatic tire.

It is the object of my present invention to improve generally upon emergency tires for automobiles; also to improve upon the interposed means whereby the emergency tread portion is supported upon the wheel rim, with the special view of making the emergency tire when applied rigid, strong, and durable so as to be thoroughly capable of withstanding the tremendous stresses to which such structures are subjected, and with the further special view of making such structure simple and of a minimum number of parts; also to improve specially upon the means whereby a standard steel channel with standard or suitable resilient tread are supportable firmly and rigidly upon the face of the wheel rim between the flanges thereof.

My invention comprises the special kind of bracket hereinafter set out for supporting the tread member upon the wheel rim, the combination of the steel channel with the series of special kind of brackets, and the parts, improvements, and combinations hereinafter set forth and claimed.

In the drawings accompanying and forming part of this specification and in the description of the drawings, I have shown my invention in its preferred form, with several modifications, and have explained what I deem to be the best mode of applying the principles thereof; but it is to be understood that, within the scope of the appended claims, I contemplate changes in form, proportions, and materials, the transposition of parts, and the substitution of equivalent members, without departing from the spirit of my invention.

In Patent No. 1,052,801, granted to me February 11, 1913, and in application Serial No. 727,479, filed by me October 24, 1912, both for improvements in emergency tires, I have shown but not claimed certain of the features herein shown and claimed.

Figure 1 is a side elevation of a wheel rim on which is mounted an emergency tire made in accordance with the principles of my invention. Fig. 2 is a longitudinal central sectional elevation of a portion of the same in the region of the valve stem hole. Fig. 3 shows, enlarged, transverse sections of the wheel rim and steel channel with an elevation of one of the simplest form of brackets which constitute the means for supporting the steel channel upon the wheel rim. Fig. 4 is a top or plan view of such steel channel and bracket. Fig. 5 is a transverse section of the steel channel, the wheel rim, and the felly across the valve stem hole, with a sectional elevation of a special form of bracket (shown partly in elevation) which is secured to the rim and felly by means of a bolt, also shown in elevation, extending through the valve stem hole, to prevent longitudinal movement of the emergency tire upon the rim; this view also shows in section a wedge used with this bracket and bolt for tightening the tire upon the rim. Fig. 6 is a top or plan view of the same bracket and wedge. Fig. 7 is a sectional elevation on a plane extending centrally and longitudinally of the rim, of a portion of the same parts. Fig. 8 shows another form of bracket, partly in section and partly in elevation, together with transverse sections of the steel channel and the wheel rim, and a bar which prevents the brackets from turning. Fig. 9 is an end elevation of the bolt whereby the two forms of brackets last described are swiveled to the steel channel. Fig. 10 is a fragmentary plan or top view of the last-described bracket (shown in Fig. 8), the steel channel, and the wheel rim, with a dotted outline of a secondary position of that bracket. Figs. 11 and 12 are side elevations of parts of the wheel rim and emergency tire, together with modified forms of locking devices or rings for preventing the swiveled brackets from turning. Figs. 13 and 14 are enlarged transverse sections of the same locking rings respectively. Fig. 15 shows a further modification of the bracket, partly in section and partly in elevation, with a transverse section of the steel channel and transverse sections of plates or rings adapted to wholly inclose the space between the steel channel and the wheel rim, the method of attaching the bracket to the steel channel here shown being a detachable means to adapt the tire for application to a wheel rim having integral or non-removable flanges, such as a plain clencher rim.

Similar reference characters indicate like or corresponding parts throughout the several views.

15 represents any ordinary wheel rim, here shown as of the quick-detachable type and having clencher flanges 16 and 17 and retaining ring 18.

19 is the tread, which may be of any suitable type or material, preferably rubber, either solid or cushion, mounted in the steel channel 20.

21 is a bracket rigidly riveted to the inner side of the steel channel by means of rivets 23 and formed with a flat bearing against said channel and with two legs 22, 22 which extend radially inwardly from the channel, spreading apart from each other from the channel inwardly to have a brace-like effect, each leg terminating at its inner end with a lug 24 which is formed to be seated against the wheel rim and against the respective flanges. Preferably the brackets are made of steel, malleable iron, drop forgings, or otherwise so that although they are radially perfectly rigid, yet they may be slightly sprung toward each other for the purpose hereinafter explained. It is a feature of my invention that these brackets are radially inexpansible, radially rigid, and each is made of a single integral piece of metal, in order that this part of my emergency tire shall be of utmost strength, simplicity, durability, and freedom from movable or complicated parts. I consider this of the greatest necessity on account of the stresses to which these parts are subjected. I use any suitable number of these brackets arranged equidistantly around the steel channel, in order to support the steel channel and tread upon the wheel rim.

To facilitate applying the emergency tire to, and removing it from, the wheel rim of the quick-detachable type, I substitute for the brackets just described, which are rigidly or non-rotatably secured to the steel channel, three brackets that are swiveled to the channel and which are capable of being turned lengthwise of the rim. Referring first to Figs. 8, 9, and 10: This bracket is similar in general shape to the bracket first described but has a cross-bar 26 at its base. It is secured to the channel by means of a bolt 27, nut 31, and lock-washer 32. The bolt is squared, 28, where it passes through the channel and is swaged therein, is round where it passes through the bracket, as shown at 29, and its end is threaded, as shown at 30, for the reception of the nut.

In attaching the tire to and removing it from the rim, this bracket is turned lengthwise of the rim, as indicated by the dotted outline in Fig. 10, and the diagonally opposite corners of the lugs are dubbed off, as shown at 34, 34, approximately on a radius from the center of the bolt, to permit such turning with relation to the flanges of the rim. Referring to Figs. 5, 6, and 7: This bracket is substantially similar to the one last described, but with the following exceptions: The legs are preferably wider apart so as to engage against the inner edges of the in-turned clencher flanges, and the lugs are omitted. There is a hole through the cross-bar to receive a bolt 41 which extends through the valve stem hole through the rim and felly 42 and is held firmly by means of a nut 61 and lock-washer 43. In connection with this bracket I use a wedge 38 between the cross-bar and the rim and having an upturned flange 39 fitting between the rim flanges and against the nut. The wedge has a hole 40 to receive the bolt, this hole being large and elongated so as to make its finding easy.

In connection with the series of brackets herein first described (shown in Figs. 3 and 4), I use only a limited number of the swiveled brackets. I use one of the last-described brackets (shown in Figs. 5, 6, and 7), which may be termed the "key-bracket," it being adapted for positive attachment to the rim to prevent "creeping," and two of the brackets shown in Figs. 8, 9, and 10, one on each side of the key-bracket. The purpose of using the three swiveled brackets in association with the non-swiveled brackets will be understood from an explanation of the operation of my emergency tire.

The rim is made ready to receive the emergency tire by removal of the retaining ring and near flange. The emergency tire is made ready for mounting upon the rim by turning the three swiveled brackets lengthwise of the tire, the wedge and the bolt 41 being removed and loose. The emergency tire is then slipped onto the rim in such position that the bolt hole through the base cross-bar of the key-bracket registers with the valve stem hole. The removed rim-flange is then placed in position on the rim, and the retaining ring is then seated; but in applying the retaining ring it will be understood that the flange of the rim is forced slightly toward the opposite side of the rim. To permit this slight compression, the legs are so constructed that, as hereinbefore explained, they may be slightly sprung together. At the place where the retaining ring is split, which is usually at the valve-stem hole, and where the start must be made in putting it in place, more inward movement of the near flange is required; and it is to meet this requirement that the three brackets are swiveled in this region. Thus, when these swiveled brackets are turned lengthwise of the rim, the near flange may be pressed inwardly without interference from the brackets, thus facilitating application of the ring at its starting and stopping points. When once started, however, it is an easy matter to force the ring into its seat all the way around. When the ring is seated, the swiveled brackets are turned cross-wise of the rim, the wedge is forced under the key-bracket (if needed), and the bolt is firmly secured. The absence of the lugs on the key-bracket permits radial movement induced by inserting the tightening wedge. In order to prevent the swiveled brackets from accidentally turning from their proper cross-wise position, I provide a short segmental band 60 which is secured to the sides of the three brackets by means of bolts 46, nuts 47, and lock-washers 48, said bolts passing through holes 44 in the legs of the brackets; and preferably the bolts 27 have respectively right and left threading, two of one and one of the other.

While the foregoing arrangement is preferable in many cases, I also contemplate the use of the tire with all brackets swiveled. In such case, I prefer to make some turn oppositely to the others, say half rights and half lefts. To prevent accidental turning from proper cross-wise position, I use a band 50 (Figs. 11 and 13) whose inner edge is inturned and notched, as shown at 51, to fit over the several brackets, the band being secured by several bolts 46, the ends 62 overlapping; or I may use a band 52 (Figs. 12 and 14), with a pin 90 adapted to seat in each hole in each bracket and secured by a series of bolts 46.

Where my emergency tire is to be used upon a rim with integral flanges, as a plain clencher rim, the form shown in Fig. 15 may be used. Here the brackets, or any number occupying approximately one-half or more of the tire, are each secured to the channel by means of a bolt 60 engaging in the threaded boss 71 in the channel and locked by lock-washer 72. The other brackets may be of the permanently attached swiveled type, or all may be of the detachable type. If partly of the permanently attached type, the tire is applied to the rim, the detachable brackets are applied separately, and the bolts applied. Also in Fig. 14 I have shown rings 80 on each side of the brackets of sufficient radial width to close the gap between the channel and the rim, and secured in place by means of bolts 81.

What I claim is:

1. In an emergency tire, the combination of a steel channel, a tread member mounted thereon, and a series of inwardly extending radially rigid and radially inexpansible brackets, each bracket being formed at its outer end to bear against the inner side of the steel channel and being rigidly secured to said channel, each bracket having two inwardly extending diverging legs, each bracket being formed at its inner end to bear against a wheel rim between the flanges thereof, and each bracket comprising a single integral piece of metal.

2. In an emergency tire, the combination of a steel channel, a tread member mounted thereon, and a series of inwardly extending radially rigid and radially inexpansible brackets secured to said channel, each bracket being formed at its outer end to bear against said channel and at its inner end to bear against the rim between the flanges thereof, and each bracket having two inwardly extending diverging integral legs.

3. In an emergency tire, the combination of a steel channel and a series of inwardly extending radially rigid and radially inexpansible brackets rigidly secured thereto, each bracket being formed at its outer end to bear against the channel and at its inner end to bear against a wheel rim between the flanges thereof.

4. In an emergency tire adapted for use in conjunction with wheel rims having side flanges, the combination of an outer rim and a series of inwardly extending brackets secured to said outer rim, each bracket being inexpansible radially and being formed at its outer end to bear against said outer rim and at its inner end to bear against the wheel rim between the flanges thereof.

In testimony whereof I have affixed my signature in presence of two witnesses.

SAMUEL DAVIDSON.

Witnesses:
JAMES DAVIDSON,
J. M. STARK.